United States Patent
Curlier et al.

(10) Patent No.: US 10,167,731 B2
(45) Date of Patent: Jan. 1, 2019

(54) TURBOMACHINE COMPRISING AN ELECTRIC CURRENT GENERATOR ALLOWING OIL INJECTION FROM THE INSIDE OF A ROTOR SHAFT

(71) Applicant: Snecma, Paris (FR)

(72) Inventors: Augustin Marc Michel Curlier, Melun (FR); Nicolas Maurice Herve Aussedat, Melun (FR); Gwénolé Yann Le Pache, Dammarie les Lys (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 693 days.

(21) Appl. No.: 14/922,647

(22) Filed: Oct. 26, 2015

(65) Prior Publication Data

US 2016/0115817 A1    Apr. 28, 2016

(30) Foreign Application Priority Data

Oct. 27, 2014 (FR) ...................................... 14 60300

(51) Int. Cl.
*F01D 15/10* (2006.01)
*H02K 7/18* (2006.01)
(Continued)

(52) U.S. Cl.
CPC .............. *F01D 15/10* (2013.01); *F01D 11/02* (2013.01); *F01D 25/16* (2013.01); *F01D 25/162* (2013.01);
(Continued)

(58) Field of Classification Search
CPC .......... H02K 7/18; H02K 7/1823; H02K 9/19; F01D 25/16; F01D 25/162; F01D 25/18;
(Continued)

(56) References Cited

U.S. PATENT DOCUMENTS

| | | | | |
|---|---|---|---|---|
| 2,571,166 A | * | 10/1951 | Rossetto | ................. F01D 25/18 184/6.11 |
| 2,866,522 A | * | 12/1958 | Frederick | ................ F01D 25/18 184/6.11 |

(Continued)

FOREIGN PATENT DOCUMENTS

| | | |
|---|---|---|
| EP | 2 549 628 A2 | 1/2013 |
| FR | 2 414 814 A1 | 1/1979 |
| FR | 2 878 287 A1 | 5/2006 |

OTHER PUBLICATIONS

Search Report issued in French Patent Application No. FR 14 60300 dated Jun. 24, 2015.

*Primary Examiner* — Tran Nguyen
(74) *Attorney, Agent, or Firm* — Pearne & Gordon LLP

(57) ABSTRACT

A turbomachine for an aircraft, comprising a rotor shaft, a turbomachine case, a lubricated bearing chamber, at least one bearing supporting the rotor shaft and being located in the bearing chamber, a lubrication device comprising oil injection means to inject oil into the bearing chamber, and oil supply means to supply oil to said oil injection means, and an electric current generator, comprising an armature driven by the rotor shaft and a field coil fixed to the turbomachine case. The generator has an orifice, which passes longitudinally through the generator from one end to the other, and the oil injection means pass through the orifice so that oil can circulate in the axial direction through the generator.

13 Claims, 3 Drawing Sheets

(51) Int. Cl.
*F01D 11/02* (2006.01)
*F01D 25/16* (2006.01)
*F01D 25/18* (2006.01)
*F01D 25/24* (2006.01)
*F16N 7/36* (2006.01)
*H02K 9/19* (2006.01)

(52) U.S. Cl.
CPC .............. *F01D 25/18* (2013.01); *F01D 25/24* (2013.01); *H02K 7/1823* (2013.01); *F16N 7/36* (2013.01); *F16N 2210/20* (2013.01); *H02K 9/19* (2013.01)

(58) Field of Classification Search
CPC .......... F01D 25/20; F01D 25/24; F01D 11/02; F01D 15/10; F02C 7/06; F04F 5/02; F04F 5/46; F16C 3/00; F16N 7/36
See application file for complete search history.

(56) References Cited

U.S. PATENT DOCUMENTS

| | | | |
|---|---|---|---|
| 3,038,556 A | 6/1962 | Hamm | |
| 4,203,044 A | 5/1980 | Linscott, Jr. | |
| 4,502,274 A * | 3/1985 | Girault | F01D 25/18 184/6.11 |
| 7,224,082 B2 * | 5/2007 | Bouiller | F01D 15/10 290/52 |
| 7,372,175 B2 * | 5/2008 | Bouiller | F01D 15/10 290/52 |
| 8,544,254 B2 * | 10/2013 | Yamashita | F01D 25/20 184/6.11 |
| 2006/0107647 A1 * | 5/2006 | Labala | F01D 25/18 60/39.465 |
| 2009/0133581 A1 * | 5/2009 | Fang | B01D 45/14 96/216 |
| 2013/0177398 A1 * | 7/2013 | Dos Santos | F01D 11/04 415/116 |

* cited by examiner

100 # TURBOMACHINE COMPRISING AN ELECTRIC CURRENT GENERATOR ALLOWING OIL INJECTION FROM THE INSIDE OF A ROTOR SHAFT

TECHNICAL DOMAIN

This invention relates to a turbomachine for an aircraft comprising an electric current generator. Such a generator may for example be advantageous for supplying energy to a device for deicing control surfaces of an aircraft fitted with such a turbomachine.

In particular, the invention relates to a turbomachine in which the generator is arranged downstream from a rotor shaft.

It is more particularly but not exclusively applicable to a twin shaft turbofan in which the generator is located downstream from a low pressure turbine shaft.

STATE OF PRIOR ART

Patent application FR 2878287 issued by the applicant (corresponding to U.S. Pat. No. 7,372,175) discloses a turbomachine comprising an electric current generator arranged on the downstream side of a low pressure turbine shaft. Oil nozzles are arranged around the shaft to inject oil into a lubricated bearing chamber.

However, with this type of turbomachine, oil cannot be injected radially outwards from inside the shaft.

Oil for lubrication of the bearing chamber usually originates from auxiliaries located in one or several structural arms of the exhaust case on the downstream side of the low pressure turbine. The layout of the generator downstream from the low pressure turbine shaft forms an obstacle to the oil pathway into a space inside this shaft.

PRESENTATION OF THE INVENTION

In particular, the purpose of the invention is to provide a simple, economic and efficient solution to this problem.

For this purpose, the invention provides a turbomachine for an aircraft comprising:
a rotor shaft;
a turbomachine case;
a lubricated bearing chamber;
at least one bearing supporting the rotor shaft, said bearing being located in the bearing chamber;
a lubrication device comprising oil injection means to inject oil into the bearing chamber, and oil supply means to supply oil to said oil injection means; and
a generator comprising an armature driven by the rotor shaft and a field coil fixed to the turbomachine case, to generate an electric current.

According to the invention, the generator comprises an orifice that passes longitudinally through the generator from one end to the other, and the oil injection means pass through the generator orifice so that oil can circulate in the axial direction through the generator.

The possibility for oil to circulate through the orifice passing through the generator makes it feasible to position the generator downstream from the rotor shaft, and inject oil from the inside of the rotor shaft.

Preferably, the oil injection means are configured so that oil circulates from a location downstream from the generator up to a location upstream from the generator.

In one particular example application of the invention, the turbomachine case is an exhaust case, the rotor shaft is a turbine shaft, and the bearing is inserted between the turbine shaft and the exhaust case.

Preferably, the oil injection means comprise at least one oil ejection orifice offset axially from the generator in a first direction, and at least part of the oil supply means is offset axially from the generator in a second direction opposite the first direction.

In one preferred embodiment of the invention, the oil injection means comprise a tube extending along the longitudinal direction in which oil ejection orifices are formed upstream from the generator.

The oil supply means preferably comprise a pipe connected to said tube, downstream from the bearing chamber.

Furthermore, the generator preferably comprises a generator casing delimiting a tubular chamber in which the armature and the field coil of the generator are located. The tubular chamber confines lubrication oil dedicated to internal components of the generator. The generator casing may also contribute to delimiting the bearing chamber.

Preferably, the lubrication device comprises evacuation means to evacuate oily air originating from the bearing chamber, and a plate fixed to the generator casing so as to close the generator orifice, the plate comprising:
at least one oil supply orifice that connects the oil injection means to the oil supply means,
at least one evacuation orifice connected to the evacuation means and opening up in the bearing chamber.

The plate can contribute to confining the bearing chamber while allowing oil injection in the chamber and evacuation of oily air.

The oil injection means preferably comprise a collar with a radially outer annular surface applied onto a radially inner annular surface of the generator casing.

The collar improves the support and centring of oil injection means.

The collar also preferably comprises at least one air passage orifice to enable circulation of oily air through the collar.

Preferably, the turbomachine comprises a deformable sealing shell fixed to either the generator casing or a wall fixed to the turbomachine case and delimiting the bearing chamber, the sealing shell having a free end connected to the other element (wall or generator casing), such that the sealing shell closes the bearing chamber.

Furthermore, the turbomachine preferably comprises an attachment shell connecting the generator casing to the turbomachine case.

In the preferred embodiment, the turbomachine comprises a step-up gearing connecting the rotor shaft to the generator armature such that the armature rotation speed is higher than the rotor shaft rotation speed.

The step-up gearing can optimise operation of the generator even at low turbomachine operating speeds when the rotation speed of the rotor shaft is relatively low.

The step-up gearing preferably comprises a planetary gearset comprising a sun gear fixed in rotation to the generator armature and a planetary carrier fixed in rotation to the rotor shaft.

The turbomachine is preferably a turbomachine comprising several turbines arranged along the upstream to downstream direction. The rotor shaft to which the generator armature is connected is then preferably driven by a rotor of the turbine located furthest downstream among the turbines in this turbomachine.

BRIEF DESCRIPTION OF THE DRAWINGS

The invention will be better understood and other details, advantages and characteristics will become clear after reading the following description given as a non-imitative example with reference to the appended drawings in which.

Identical references in all these figures may denote identical or similar elements.

DETAILED PRESENTATION OF ONE PREFERRED EMBODIMENT

Figure 1:
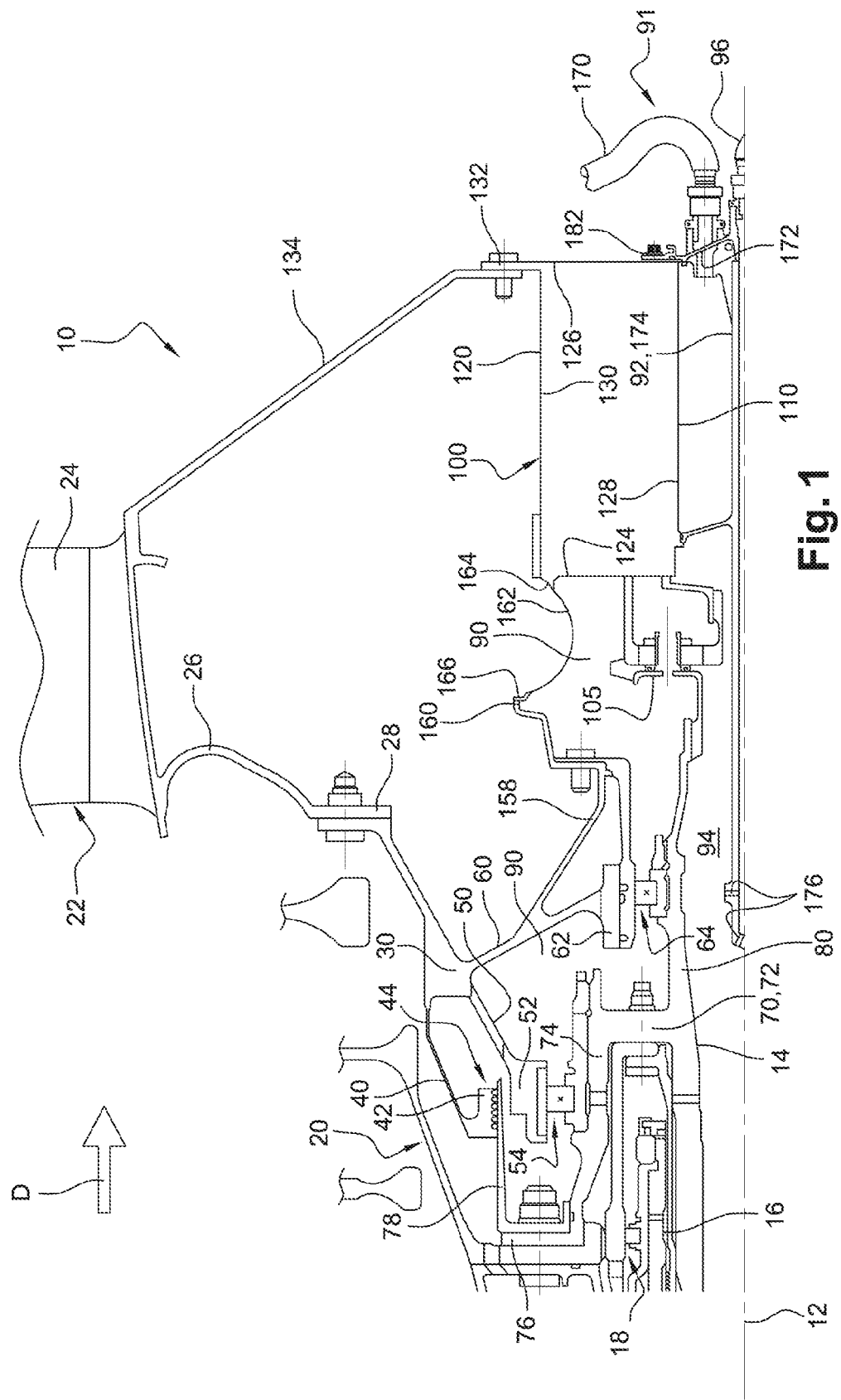
FIG. 1 is a partial axial sectional diagrammatic half-view of a turbomachine according to a preferred embodiment of the invention.

FIG. 1 shows a rear part of an aircraft turbomachine 10 that in this example is a twin shaft turbofan, centred with respect to a longitudinal axis 12.

It should be noted that throughout this description, the terms <<upstream>> and <<downstream>> should be considered relative to a main gas flow direction through the turbomachine, symbolically represented by the arrow D in FIG. 1.

FIG. 1 shows a rear portion of a hollow low pressure turbine shaft 14 centred on the longitudinal axis 12, and a first trunnion 16 fixed to a high pressure turbine shaft. This first trunnion 16 surrounds the low pressure turbine shaft 14, and is centred relative to the shaft by means of a bearing 18 sometimes referred to as <<inter-turbine bearing>>.

In a manner known in itself, the high pressure turbine shaft is coupled to a high pressure turbine rotor (not shown in FIG. 1) usually comprising one or two high pressure turbine disks, while the low pressure turbine shaft 14 is coupled to a low pressure turbine rotor 20 comprising several low pressure turbine disks (of which only a radially inner portion sometimes called the "balancing bulb" is shown in FIG. 1).

FIG. 1 also shows a radially inner portion of an exhaust case 22 of the turbomachine. More specifically, it shows the radially inner portion of one of the structural arms 24 forming this exhaust case, and a shell 26 extending radially inwards from the bottom of the structural arms and having a radially inner annular flange 28 onto which an annular support 30 is fixed.

In the example shown, the annular support 30 is divided into several fixed annular walls, namely:

a first annular wall 40, of which the radially inner end 42 forms a radially outer part of a labyrinth seal 44, a second annular wall 50 of which the radially inner end 52 forms a radially outer support of an upstream bearing 54, and a third annular wall 60 of which the radially inner end 62 forms a radially outer support of a downstream bearing 64.

The low pressure turbine shaft 14 is fixed to a second trunnion 70 comprising a radial portion 72 extending from the low pressure turbine shaft 14, downstream from a downstream end of the first trunnion 16. At the radially outer end of the radial portion 72, the second trunnion 70 is prolonged by an axial portion 74 with a generally cylindrical and/or tapered shape extending towards the upstream direction. This axial portion 74 forms a radially inner support for the upstream bearing 54. The upstream end of the axial portion 74 extends radially outwards with a radial annular flange 76 onto which the low pressure turbine rotor 20 and a radially inner part 78 of the labyrinth seal 44 are fixed.

Furthermore, the low pressure turbine shaft 14 comprises an annular portion 80 downstream from the second trunnion 70, forming a radially inner support for the downstream bearing 64.

Thus, the two bearings 54 and 64 can be used for centring the low pressure turbine shaft 14 relative to the annular support 30, and therefore relative to the exhaust case 22.

These two bearings are housed in a bearing chamber 90 delimited in the upstream direction by the labyrinth seal 44.

The bearing chamber 90 is lubricated by means of a lubrication device 91, particularly comprising oil injection means to inject oil into the bearing chamber, and oil supply means to supply oil to said oil injection means, as will become clear in the following.

More precisely, the oil injection means 92 are designed to inject oil into an inner space 94 inside the low pressure turbine shaft 14. This inner space 94 is sometimes called the <<downstream inner space>> when this space is separated from another inner space of the shaft located further upstream, the two spaces then being separated by means of a partition or plug located inside the shaft. The oil injection means 92 are themselves supplied by oil supply means 96 located downstream from the lubricated chamber, as will become clear in the following. The low pressure turbine shaft 14 is provided with oil passage orifices (not shown in FIG. 1) that will allow the passage of oil from the inner space 94 of the shaft as far as the bearing chamber 90.

Furthermore, the turbomachine is fitted with a generator 100 (visible at larger scale in FIG. 2) comprising an armature 102 driven by the low pressure turbine shaft 14 and a field coil 104 fixed to the exhaust case 22, to generate an electric current. This generator 100 is located downstream from the downstream end 105 of the low pressure turbine shaft 14.

According to one particular feature of the invention, the generator 100 comprises an orifice 110, that passes longitudinally through the generator from one end to the other, and the oil injection means 92 pass through the orifice 110 to circulate oil from downstream to upstream from this generator. Oil can thus circulate in the downstream to upstream direction, from the oil supply means 96 to a location vertically in line with the bearing chamber 90.

More precisely, the generator 100 comprises a casing 120 delimiting a tubular chamber 122 (FIG. 2) inside which the armature 102 and the field coil 104 are located. The casing 120 of the generator has two end walls, the upstream wall 124 and the downstream wall 126 respectively, for example each in the form of a plane ring, and two longitudinal walls, the radially inner wall 128 and the radially outer wall 130 respectively, that connect the two end walls 124 and 126 to each other. These two longitudinal walls 128 and 130 may for example each be in the form of a cylinder of revolution.

The radially inner ends of the upstream end wall 124 and the downstream end wall 126 have cylindrical rims 125 and 127 respectively.

The downstream end wall 126 has a radially outer annular flange 132 connected to the exhaust case 22 through an attachment ring 134 (FIG. 1).

Figure 2:
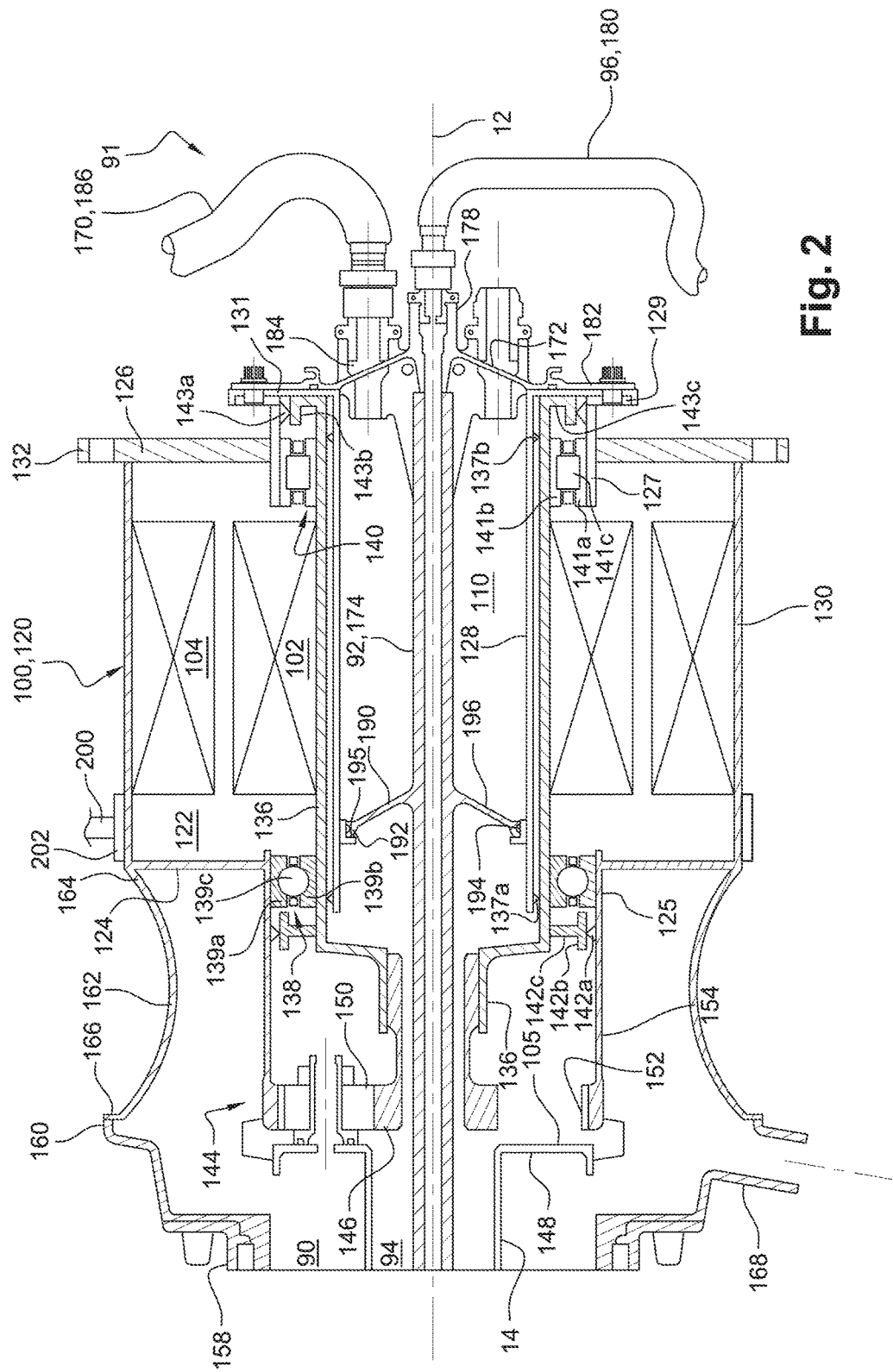
FIG. 2 is a partial axial sectional diagrammatic half-view of the turbomachine in FIG. 1 at a larger scale.

As can be seen in FIG. 2, the cylindrical rim 127 of the downstream end wall 126 comprises a radial annular flange 129 at its downstream end.

The radially longitudinal inner wall 128 delimits the outside of the generator orifice 110. This orifice 110 opens up through the upstream end wall 124 at the upstream end and through the downstream end wall 126 at the downstream end.

The radially inner longitudinal wall 128 comprises a radial annular flange 131 at its downstream end fixed onto the radial annular flange 129 of the downstream end wall 126, for example by bolts.

As can be seen diagrammatically in FIG. 2, the armature 102 is supported by an armature support 136 in the form of an annular wall extending around the radially inner longitudinal wall 128 and installed free to rotate in an upstream bearing 138 and a downstream bearing 140 housed in the tubular chamber 122. The upstream bearing 138 comprises an outer ring 139a fixed to or formed on the inner face of the cylindrical rim 125 of the upstream end wall 124, an inner ring 139b fixed to or formed on the outer face of the armature support 136, and balls 139c inserted between the two rings 139a and 139b, so as to form a ball bearing in a manner known in itself. As a variant, the upstream bearing 138 may be a roller bearing or it may be replaced by another similar guide means. The downstream bearing 140 comprises an outer ring 141a fixed to or formed on the inner face of the cylindrical rim 127 of the downstream end wall 126, an inner ring 141b fixed to or formed on the outer face of the armature support 136, and rollers 141c inserted between the two rings 141a and 141b, so as to form a roller bearing in a manner known in itself. As a variant, the downstream bearing 140 may be a ball bearing or it may be replaced by any other similar guide means.

For example, the tubular chamber 122 may be confined by an upstream dynamic seal 142a, formed on the inner surface of the cylindrical rim 125 of the upstream end wall 124, upstream from the upstream bearing 138, and engaging with a cylindrical seal seat 142b formed at the radially outer end of a collar 142c extending from the armature support 136. For example, the tubular chamber 122 may be confined on the downstream side by a downstream dynamic seal 143a formed on the inner surface of the cylindrical rim 127 of the downstream end wall 126, downstream from the downstream bearing 140, and engaging with a cylindrical s seal seat 143b formed at the radially outer end of a collar 143c extending from the armature support 136.

Furthermore, the armature support 136 may for example be guided around the radially inner longitudinal wall 128 by means of two guide rings 137a and 137b close to the upstream and downstream ends respectively of the wall 128 and inserted between the wall and the armature support 136. These guide rings may for example be made from Teflon or they may be shrink-fitted.

The generator 100 is provided with a lubrication system for the tubular chamber 122 that is not visible on the figures and will not be described in detail, since this system may be conventional. For example, this system may comprise an oil supply pipe 200 opening up into an annular distribution chamber 202 communicating with the tubular chamber 122.

In the preferred embodiment shown in the figures, the armature 102 of the generator 100 is connected to the low pressure turbine shaft 14 through a step-up gearing 144, for example of the type comprising a planetary gearset (FIG. 2).

More precisely, the armature support 136 comprises a gear wheel at its upstream end forming the sun gear 146 of the step-up gearing 144, while the low pressure turbine shaft 14 comprises an annular flange at its downstream end forming the planetary carrier 148 of the step-up gearing 144. FIG. 2 shows one of the planet gears 150 installed free to rotate on the planetary carrier 148. Furthermore, the step-up gearing 144 comprises an outer ring 152 formed at the upstream end of an annular flange 154 that extends the cylindrical rim 125 of the upstream end wall 124 of the generator in the upstream direction. In a manner known in itself, the planet gears 150 are gears engaging with internal teeth on the outer ring 152 and with the sun gear 146, so that a rotational displacement of the planetary carrier 148 will rotate the sun gear 146 at an angular speed higher than that of the planetary carrier 148.

In the embodiment shown, the outer ring 152, and the gears forming the sun gear 148 and the planet gears 150, have for example helical teeth, to provide axial support of these elements relative to each other. Thus, these elements may for example have a herringbone tooth pattern.

Furthermore, as can be seen in FIGS. 1 and 2, the third annular wall 60 belonging to the annular support 30 has an extension 158 towards the downstream direction comprising an annular lip 160 at its downstream end.

The turbomachine also comprises a sealing shell 162 that is relatively flexible along the axial direction, and has a downstream end 164 fixed to the casing 120 of the generator 100 and a free upstream end 166 in contact with the annular lip 160. The sealing shell 162 thus contributes to delimiting the bearing chamber 90 and thus confines this bearing chamber. The sealing shell can be made flexible due to its geometric configuration and/or the choice of its constituent material. This flexibility means that the sealing shell can deform so as to maintain contact between its free end 166 and the annular lip 160 despite differential expansions that are generally characteristic of operation of the turbomachine.

Furthermore, the extension 158 preferably comprises at least one drain 168 (FIG. 2) through which any running oil on the inner surface of the extension 158 or the sealing shell 162 can escape. To achieve this, the drain is preferably connected to a drain circuit of the turbomachine. Such a drain circuit may be of a conventional type and will not be described herein. One or several additional drains may also be arranged at the downstream end of the sealing shell 162 if the shape of the sealing shell makes it necessary.

The lubrication device 91 will now be described in more detail.

This device comprises the oil injection means 92, the oil supply means 96, and evacuation means 170, and a plate 172.

Figure 3:
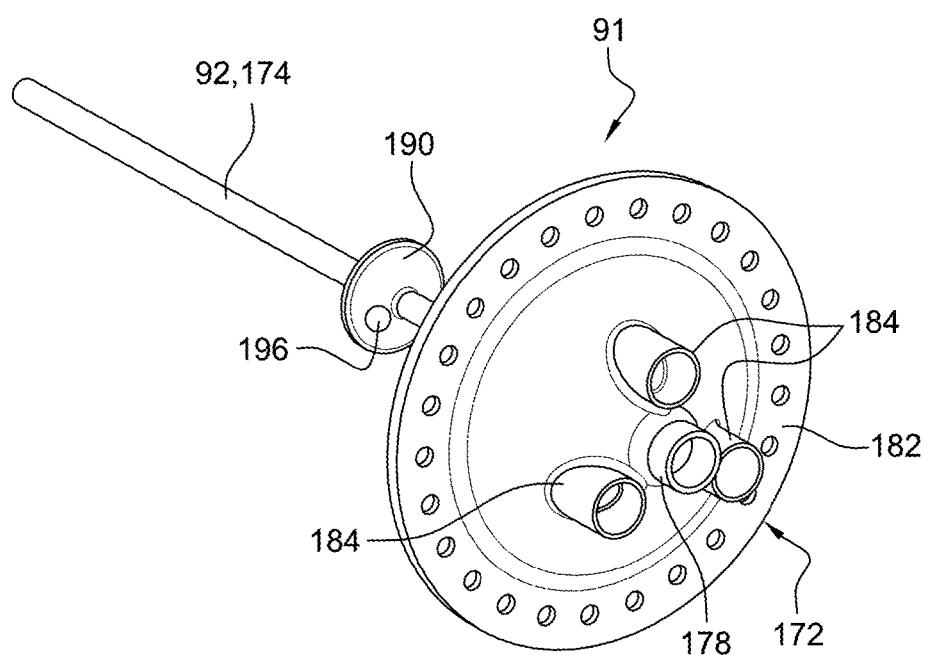
FIG. 3 is a partial perspective diagrammatic view of a lubrication device forming part of the turbomachine in FIG. 1.

The oil injection means 92 comprise a tube 174 extending along the longitudinal direction, usually preferably centred on the longitudinal axis 12 (FIGS. 1 and 3). The tube 174 is provided with oil ejection orifices 176 (FIG. 1) arranged on the upstream side of the generator 100, preferably close to the upstream end of the tube 174, so that lubricating oil can be injected into the bearing chamber 90.

The plate 172 comprises an oil supply orifice 178 centred on the longitudinal axis 12 to which the tube 174 is connected (FIGS. 2 and 3).

The oil supply means 96 comprise a pipe 180 for which the outlet (shown in FIGS. 1 and 2) is connected to the oil supply orifice 178 of the plate 172, and therefore to the tube 174, downstream from the bearing chamber 90, and for which the inlet (not shown in the figures) is connected to a turbomachine oil circuit, for example at a structural arm 24 of the exhaust case 22.

The plate 172 is fixed to the casing 120 of the generator 100 so as to close the orifice 110 of the generator. To achieve this, the plate 172 may for example comprise a peripheral annular flange 182 fixed to the downstream end wall 126 of the generator (FIGS. 2 and 3), for example by bolts.

Furthermore, the plate 172 comprises at least one evacuation orifice 184 connected to the evacuation means 170 and opening up into the bearing chamber 90. In the example shown in the figures, there are three evacuation orifices 184 (FIG. 3), and the evacuation means 170 comprise three evacuation pipes 186 (only one of which can be seen in FIGS. 1 and 2), that are connected firstly to the three oil evacuation orifices 184 of the plate 172, and secondly to a circuit (not shown in the figures) that will evacuate oily air from the bearing chamber 90, respectively.

Air passage orifices (not shown in the figures) are also provided within the low pressure turbine shaft 14 close to its downstream end, and/or within the annular flange 154 and the portion of the armature support 136 that extends outside the tubular chamber 122 of the generator 100, so as to enable circulation of oily air in the downstream direction as far as the evacuation orifices 184. Due to the presence of these air passage orifices, the inner space 94 of the low pressure turbine shaft 14 and the inside of the orifice 110 of the generator communicate with the bearing chamber 90, and, using the terminology of this description, form an integral part of this bearing chamber. Thus, in particular, the inner longitudinal wall 128 of the generator casing 120 contributes to delimiting the bearing chamber 90.

The oil injection means 92 also comprise a collar 190 with a radially outer annular surface 192 applied in contact with a radially inner annular surface 194 of the casing 120 of the generator 100, to provide optimum support for the tube 174 in its position centred on the longitudinal axis 12. The collar 190 comprises at least one air passage orifice 196 (FIG. 2). In the example shown, the radially inner annular surface 194 of the casing 120 is formed on an annular contact surface axially delimited in the upstream direction by a shoulder 195 providing axial retention of the collar 190 in the upstream direction.

During operation, oil from the pipe 180 of the oil supply means 96 penetrates into the tube 174 and flows in the upstream direction as far as the oil ejection orifices 176 that spray oil towards the wall of the low pressure turbine shaft 14. In other words, oil thus circulates from a location downstream from the generator 100 up to a location upstream from the generator. Oil then passes through the oil passage orifices provided for this purpose in the shaft 14, and then thus penetrates into the bearing chamber 90. Oil is then guided towards the bearings 54 and 64 by means provided for this purpose, which may be conventional. These means are independent of this invention, and will not be described in detail herein.

Oily air inside the bearing chamber 90 circulates in the downstream direction through air passage orifices provided within the low pressure turbine shaft 14, and/or within the annular flange 154 of the armature support 136, and through the air passage orifice 196 provided within the collar 190. Oily air thus reaches the evacuation orifices 184 and then continues to circulate in the evacuation pipes 186.

Furthermore, rotational displacement of the low pressure turbine shaft 14 causes rotational displacement of the planetary carrier 148 and therefore also rotational displacement of the sun gear 146 and the armature 102 fixed to it in rotation, at a speed considerably higher than the speed of the shaft 14, typically by a factor of between two and ten. Displacement of the armature 102 relative to the field coil 104 generates electric current, in a manner known in itself.

Such an electric current may be used to supply various equipment of the turbomachine or of an aircraft in which this turbomachine is installed, for example to supply a device for deicing aircraft control surfaces.

The invention can thus reconcile positioning of the generator 100 downstream from the low pressure turbine shaft 14, particularly in a configuration centred on the longitudinal axis 12, with injecting lubricating oil from the inner space 94 of the shaft 14.

The invention claimed is:

1. A turbomachine for an aircraft, comprising:
 a rotor shaft;
 a turbomachine case;
 a lubricated bearing chamber;
 at least one bearing supporting the rotor shaft, said bearing being located in the bearing chamber;
 a lubrication device comprising oil injection means to inject oil into the bearing chamber, and oil supply means to supply oil to said oil injection means; and
 a generator, comprising an armature driven by the rotor shaft and a field coil fixed to the turbomachine case, to generate an electric current;
 wherein the generator has an orifice, that passes longitudinally through the generator from one end to the other, and
 wherein the oil injection means pass through the generator orifice so that oil can circulate in the axial direction through the generator.

2. The turbomachine according to claim 1, in which the oil injection means are configured so that oil circulates from a location downstream from the generator up to a location upstream from the generator.

3. The turbomachine according to claim 2, in which the turbomachine case is an exhaust case, the rotor shaft is a turbine shaft, and the bearing is inserted between the turbine shaft and the exhaust case.

4. The turbomachine according to claim 1, in which the oil injection means comprise at least one oil ejection orifice offset axially from the generator in a first direction, and at least part of the oil supply means is offset axially from the generator in a second direction opposite the first direction.

5. The turbomachine according to claim 1, in which the oil injection means comprise a tube extending along the longitudinal direction and in which oil ejection orifices are formed upstream from the generator.

6. The turbomachine according to claim 5, in which the oil supply means comprise a pipe connected to said tube, downstream from the bearing chamber.

7. The turbomachine according to claim 1, in which the generator comprises a generator casing delimiting a tubular chamber in which the armature and the field coil of the generator are located.

8. The turbomachine according to claim 7, in which the lubrication device comprises evacuation means to evacuate oily air originating from the bearing chamber, and a plate fixed to the generator casing so as to close the generator orifice, said plate comprising:
 at least one oil supply orifice that connects the oil injection means to said oil supply means,
 at least one evacuation orifice connected to said evacuation means and opening up in the bearing chamber.

9. The turbomachine according to claim 7, in which said oil injection means comprise a collar with a radially outer annular surface applied onto a radially inner annular surface of the generator casing, said collar comprising at least one air passage orifice.

10. The turbomachine according to claim 7, comprising a deformable sealing shell fixed to one of the generator casing and a wall fixed to the turbomachine case and delimiting the bearing chamber, the sealing shell having a free end connected to the other one of the generator casing and the wall, such that the sealing shell closes the bearing chamber.

11. The turbomachine according to claim 7, comprising an attachment shell connecting the generator casing to the turbomachine case.

12. The turbomachine according to claim 1, also comprising a step-up gearing connecting the rotor shaft to the generator armature such that the armature rotation speed is higher than the rotor shaft rotation speed.

13. The turbomachine according to claim 3, comprising several turbines installed along the upstream to downstream direction, wherein said rotor shaft is driven by a rotor of the turbine installed furthest downstream.

\* \* \* \* \*